United States Patent [19]

Schulz et al.

[11] 4,382,137
[45] May 3, 1983

[54] MOLDED RESIN PRODUCT AND PROCESS FOR PRODUCING SAME

[75] Inventors: Johann G. Schulz, Pittsburgh; Walter P. Barie, Jr., Glenshaw; James T. Eurich, Marwood, all of Pa.

[73] Assignee: Gulf Research & Development Company, Pittsburgh, Pa.

[21] Appl. No.: 232,996

[22] Filed: Feb. 9, 1981

[51] Int. Cl.$^3$ ............................................. C08G 63/12
[52] U.S. Cl. ............................. 527/500; 264/250; 264/336; 264/DIG. 59; 264/DIG. 64; 264/DIG. 65; 528/274; 528/281; 528/282; 528/286; 528/292
[58] Field of Search ............... 264/DIG. 64, DIG. 59, 264/DIG. 65, 336, 250; 528/292, 274, 281, 282, 286; 527/500

[56] References Cited

U.S. PATENT DOCUMENTS

| | | | |
|---|---|---|---|
| 2,379,248 | 6/1945 | Muskat | 264/DIG. 59 |
| 2,401,581 | 6/1946 | Muskat et al. | 264/DIG. 59 |
| 2,912,418 | 11/1959 | Johnson et al. | 264/DIG. 59 |
| 2,965,587 | 12/1960 | Rickert | 527/500 |
| 3,013,305 | 12/1961 | Koch | 264/DIG. 59 |
| 3,023,459 | 3/1962 | Cook | 264/DIG. 65 |
| 3,235,530 | 2/1966 | Crouch et al. | 264/258 |
| 3,749,688 | 7/1973 | Mihelic et al. | 527/500 |
| 4,052,448 | 10/1977 | Schulz et al. | 521/143 |
| 4,101,526 | 7/1978 | Buxbaum | 528/286 |
| 4,239,717 | 12/1980 | Wintner | 264/DIG. 65 |

*Primary Examiner*—Ronald W. Griffin
*Attorney, Agent, or Firm*—Deane E. Keith; Forrest D. Stine; Joseph J. Carducci

[57] ABSTRACT

Novel resin products produced by reacting unique polycyclic, aromatic, polycarboxylic acid products with low molecular weight polyols display satisfactory toughness properties and good Barcol hardness values. The process for preparing these novel resin products first involves preparing an intimate, finely divided mixture comprising the acid product derived from the nitric acid oxidation of naturally occurring solid carbonaceous material, a roughly equivalent amount of a liquid polyol, and a suitable acid catalyst. The mixture is then subjected to a precure step which involves heating at temperatures between 80° and 150° C. for from about fifteen minutes to about four hours. The precured mixture may thereafter be subjected to suitable molding conditions at a temperature below about 220° C.

10 Claims, No Drawings

MOLDED RESIN PRODUCT AND PROCESS FOR PRODUCING SAME

This invention relates to new and useful molding compositions capable of being molded to solid resinous materials having desirable Barcol hardness properties. More particularly, this invention relates to novel resin molding compositions and to the solid, hard, nonbrittle cross-linked polymeric molded products formed by curing the molding compositions in a unique two-step molding process.

The unique properties of the molded resin compositions of the present invention are due, first, to the use of unique poly-functional acid materials in the resin composition and, second to the molding process, itself. The polyfunctional acid materials to be used may be described generally as the polycyclic, aromatic, polycarboxylic acid products obtained from the nitric acid oxidation of naturally occurring solid carbonaceous materials such as coal. The processes by which these acid products are obtained are more fully described in U.S. Pat. No. 4,052,448.

SUMMARY OF THE INVENTION

The present invention provides a novel moldable resin composition capable of being cured, under suitable molding conditions to be described, into a solid resinous material having improved hardness properties. According to the present invention, the novel curable mixture comprises (1) The acid product derived from the nitric acid oxidation of naturally occurring solid carbonaceous material, and consisting essentially of a mixture of polycyclic aromatic polycarboxylic acids, and (2) At least one polyol defined by the formula

HO—R—(OH)$_x$ where x is from 1 to 5, and R is an organic bifunctional radical selected from the group consisting of aliphatic, cycloaliphatic and carbocyclic radicals having from 2 to 10 carbon atoms,
along with a suitable quantity of Bronsted or Lewis acid capable of initiating and maintaining the reaction between the polyfunctional compounds.

For most uses it will be desirable to develop a stoichiometrically balanced mixture of polyol and polycarboxylic acid. By this we mean that the total acid equivalents of the polyfunctional acid product should be approximately equal to the number of available hydroxy groups in the polyol. We have found it acceptable, however, for the ratio of total acid neutral equivalents to total available hydroxyl groups in the uncured curable mixture to be in the range from about 0.5 to 1.0 to about 3.0 to 1.0. However, it is preferred that this acid to alcohol ratio be in the range from about 1:1 to about 2:1.

In preparing the curable mixture, the three basic components should be combined so as to assure intimate contact among the various components. This can be accomplished, and the curable mixture produced in the form of a fine powder, by means of a comminution stage. It is preferred to mix the components of the curable mixture in a ball mill, using Burundum balls, for about 1 to 24 hours, preferably for about 16 to about 24 hours, at ambient temperature and pressure conditions, until the particle size has been reduced to the stage where substantially all particles will pass through a 50 mesh screen.

The curable mixture prepared according to the procedures outlined above is thereafter subjected to a precure heating step. This precure step is critical in order to obtain a moldable resin composition. The precure conditions will depend to some extent on the particular components of the curable mixture utilized. Those skilled in this art will be able to determine the appropriate optimum parameters with minimal routine experimentation. It has been found necessary, however, in order to produce a satisfactory moldable composition, to heat the curable mixture after comminution to a temperature between about 80° to about 150° C., for about 15 minutes to about 4 hours. The pressure is preferably atmospheric, or ambient. However, so long as molding conditions are not reached, and depending upon the activity and initial stability of the curable mixture components employed, the pressure can be as low as 10 millimeters of mercury to as high as about 1000 pounds per square inch gauge (13.9 MPa), or even higher.

To aid those skilled in the art in determining the optimum precure conditions, it appears that the precure heating step, accomplished as it is after the curable mixture has been finely divided and thoroughly and intimately combined, causes labile carboxyl groups on the polycarboxylic acids to link up or react partially with hydroxyl groups on the polyol, thus causing the acid material to be further stabilized against decarboxylation during the higher temperatures in the actual molding step. This partial stabilizing through "fixation" of the carboxyl groups, enables the moldable resin compositions produced according to the present invention to withstand relatively wide extremes of temperature, handling and storage conditions.

The pre-mixed and pre-cured moldable compositions produced according to the present invention may be packaged and stored for later use, or they may be used directly to produce molded resin products. In molding the compositions of the invention, it is critical, however, that certain defined molding conditions be met. For example, molding temperature should be at least 170°, but should not exceed about 220° C., and preferably should be in the range between about 190° to 210° C. Molding pressure should ordinarily be kept within the range between about 2000 to 10,000 psi gauge, but, depending on the particular molding temperature, the time of molding and the extent of pre-cure, may be as low as 200 psi or as high as 20,000 psi. The solid resin materials produced have particularly desirable Barcol hardness characteristics, making them suitable for molding into numerous components.

DETAILED DESCRIPTION OF THE INVENTION

The Polycarboxylic Acids

The polycarboxylic acids to be employed in the curable mixtures of the present invention are polycyclic, aromatic polycarboxylic acids derived by the nitric acid oxidation of naturally occurring solid carbonaceous materials such as coal. The nitric acid oxidation of aqueous slurries of carbonaceous materials such as coal, wherein the oxidation is carried out at temperatures in the range of about 15° to about 200° C. and for about 0.5 to about 15 hours, produces mixtures of polycyclic, aromatic, polycarboxylic acids, some of which are soluble in polar solvents, such as acetone but not soluble in water, some of which are soluble in water and in polar solvents, and some of which are soluble in neither water nor polar solvents, except under extreme conditions.

Processes for producing these acid products are disclosed in U.S. Pat. Nos. 4,052,448; 4,137,418; 4,195,185 and 4,195,186, the disclosures of which, to the extent necessary to complete the teaching of this application and to fully enable those skilled in this art to make and use the acid products contemplated for use in the moldable compositions of the present invention, are hereby incorporated by reference. The disclosures of these patents give a more detailed discussion of the acid products and the manner and process of deriving them from carbonaceous materials such as coal.

Partially because they may be obtained without the necessity of expensive and time-consuming separation techniques, and partially because they have appropriate molecular weight and poly-functional properties, those acid products of the nitric acid oxidation of coal which are insoluble in both water and acetone are the preferred acid products for use in preparing the curable mixtures of the present invention.

With the above in mind, a general description of the preferred procedure for producing the acid products to be utilized in the curable mixtures of the present invention will now be set forth.

In the preferred procedure, an aqueous solution of nitric acid, wherein the acid concentration ranges from about 5% to about 90% but preferably in the range from 10% to about 70%, is contacted with an aqueous slurry of carbonaceous materials such as coal in particulate form and consisting of from about 50% to about 90% water.

Suitable carbonaceous material can have the following composition on a moisture free basis:

TABLE I

| | Weight Percent | |
|---|---|---|
| | Broad Range | Preferred Range |
| Carbon | 45–95 | 60–92 |
| Hydrogen | 2.5–7 | 4–6 |
| Oxygen | 2.0–45 | 3–25 |
| Nitrogen | 0.75–2.5 | 0.75–2.5 |
| Sulphur | 0.3–10 | 0.5–6 |

The carbon and hydrogen content of the carbonaceous material will reside primarily in multi-ring compounds (condensed or uncondensed), ether or cyclic compounds, and the like. Oxygen and nitrogen are believed to be present primarily in chemical combination. Some of the sulphur is believed to be present in chemical combination with the aromatic compounds and some in chemical combination with inorganic elements associated therewith, for example iron and calcium.

In addition to the above, the solid carbonaceous material being treated will also contain solid, primarily inorganic, compounds which will not be converted to the desired organic mixture. These solid inorganic materials are termed ash, and are composed chiefly of compounds of silicon, aluminum, iron and calcium, with smaller amounts of compounds of magnesium, titanium, sodium and potassium. The ash content of the carbonaceous material treated can sometimes amount to as much as about 50 weight percent, based on the moisture-free carbonaceous material. In general, however, it will amount to no more than from about 0.1 to about 30 weight percent, usually about 0.5 to about 20 weight percent.

Anthracitic, bituminous and subituminous coal, lignitic materials, and other types of coal products referred to in ASTM D-388, are exemplary of the solid carbonaceous material which can be treated to produce the organic mixture. Some of these carbonaceous materials in their raw state will contain relatively large amounts of water. These can be dried prior to use herein so that the carbonaceous material has a fixed carbon content that does not exceed 86 weight percent and a volatile metal content of at least about 14 weight percent as determined on an ash-free basis.

The carbonaceous material, prior to use is preferably ground in a suitable attrition machine, such as a hammermill, to a size such that at least 50% of the carbonaceous material will pass through a 40 mesh (U.S. series) sieve. As noted, the carbonaceous material is slurried in a suitable carrier, preferably water, prior to reaction with nitric acid. If desired the carbonaceous material can be treated prior to reaction, using any conventional means, to remove therefrom any materials forming a part thereof that will not be converted in reaction with nitric acid.

The reaction mixture in the reactor is stirred while being maintained at a temperature of about 15° to about 200° C., preferably about 50° to about 120° C., and a pressure of about atmospheric to about 1000 pounds per square inch gauge, preferably about atmospheric to about 500 pounds per square inch gauge for about 0.5 to about 15 hours, preferably about 2 to about 6 hours. In order to obtain the desired mixture without losing appreciable amounts of carboxyl or nitro groups on the acids that are formed during oxidation, and to obtain the desired acids in high yields in the reactor, it is absolutely critical that the reaction conditions contained herein, namely nitric acid concentration, temperature, pressure and reaction time, be correlated as to minimize and, preferably, to avoid decarboxylation and denitrofication. Gaseous products, such as nitrogen oxides, can be removed from the reactor in any suitable manner.

The reaction product removed from the reactor is found to be soluble, or reactable with, sodium hydroxide. Separation of the oxidized product from the water and nitric acid associated with it must be accomplished in a manner so that the carboxyl and nitro groups are not removed from the acid product. Distillation for the removal of the water will not suffice, because under the conditions required for such separation, a significant loss of carboxyl groups and nitro groups would occur. Mechanical separation will suffice. The reaction product is therefor led to a first separator, which can be a filter or centrifuge.

The solids that are recovered in the separator, contain a mixture of polar solvent soluble acid products and polar solvent insoluble acid products which are soluble in sodium hydroxide. By polar solvent is meant solvents such as methanol, ethanol, isopropynol acetone, methyl ethylketone, tetro-hydrofuran, dioxane, cyclohexonone, and the like. These polycyclic, aromatic, polycarboxylic acids may be used for this invention without further separation.

The solids that are recovered from the separation step disclosed above can be further separated into polar solvent soluble and polar solvent insoluble components. The solids are lead to a second separator wherein they are subjected to extraction with a polar solvent, preferably acetone. Such separation can be carried out at a temperature of about 20° to about 60° C., preferably 25° to about 50° C., and a pressure of about atmospheric to about 500 pounds per square inch gauge, preferably about atmospheric about 100 pounds per square inch gauge. The solid material, insoluble in acetone, is removed from the second separator. These solids are polar solvent insoluble, water insoluble polycyclic, aromatic, polycarboxylic acids which can also be used in this invention.

The polar solvent solution from the second separator is then led to a drier wherein the polar solvent is separated from the polar solvent soluble, water insoluble polycyclic, aromatic, polycarboxylic acid. As before, the acid mixture must be removed from the acetone by so correlating the conditions as to minimize and, preferably, avoid, decarboxylation and denitrofication. This separation could be accomplished by use of a drier; the temperature can be in the range of about 10° to about 60° C., preferably about 20° to about 50° C., the pressure can be about 10 millimeters of mercury to about atmospheric, preferably about 30 millimeters of mercury to about atmospheric, for about 0.5 to about 24 hours, preferably about 1 to about 5 hours.

The filtrate obtained in the first separation will contain, in addition to water, nitric acid and most of the inorganic material (ash) that was present in the carbonaceous charge, a quantity of polar solvent soluble, water soluble polycyclic, aromatic, polycarboxylic acids which are suitable for use in this invention. Separation of the filtrate into its component parts can be effected as follows: the filtrate can be passed to a distillation tower maintained at a temperature of about 50° to about 100° C., preferably about 70° to about 90° C., and a pressure of about 10 millimeters of mercury to about atmospheric. Under these conditions nitric acid and water are removed from the distillation tower. The residual solids are led to a separator where they are subjected to extraction with a polar solvent, preferably acetone. The extraction can be carried out at a temperature of about 20° to about 60° C., preferably about 25° to about 50° C., and a pressure of about atmospheric to about 500 pounds per square inch gauge, preferably about atmospheric to about 100 pounds per square inch gauge. The solid material (ash) is separated from the solution in any convenient manner, for example, filtration. The polar solvent solution is then led to a drier wherein the polar solvent is separated and the desired polar solvent soluble, water soluble polycyclic, aromatic, polycarboxylic acids are recovered. The temperature in this drier can be in the range of about 10° to about 60° C., preferably about 20° to about 50° C., and the pressure can be from about 10 millimeters of mercury to about atmospheric, preferably about 30 millimeters of mercury to about atmospheric. Drying should take about 0.5 to about 24 hours, preferably about 1 to about 5 hours.

The Polyols

The second component of the curable mixtures prepared according to the present invention is one or more polyols, which can be defined by reference to the following formula:

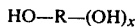

$$HO-R-(OH)_x$$

where x is a number from 1 to 5, preferably from 1 to 3, and R represents an organic bifunctional radical selected from the group consisting of aliphatic, cyclo aliphatic, and carbocyclic radicals having from 2 to 10 carbon atoms.

Specific examples of suitable polyols defined by the above formula where R represents an aliphatic biradical are ethylene glycol, 1,2-propylene glycol, 1,4-butanediol, pentanediol, diethylene glycol, triethylene glycol, tetraethylene glycol, hexaethylene glycol, glycerine, trimethylol ethane, trimethylol propane, and pentaerythritol. Additional specific examples of suitable polyols include adonitrol, d- and l-arabitol, xylitol, sorbitol, cyclopentanediol, cyclohexanediol, hydrogenated Bisphenol A, and 1,4-di(hydroxyethyl)benzene.

Acid Catalyst

The third component of the novel molding compositions of the present invention is an acid catalyst. The term "acid catalyst" is intended to include those compounds or compositions which are capable of functioning as a proton donor (Bronsted acid) or electron acceptor (Lewis acid) in a typical chemical oxidation/reduction reaction. More particularly, the term refers to those compounds or compositions which are capable of initiating and maintaining the reaction between a polyfunctional acid and a polyol by the esterification mechanism, as will be well understood by those skilled in this art. Examples of suitable acid catalysts for use in the mixtures of the present invention are para-toluenesulfonic acid, phosphoric acid, zinc chloride, aluminum trichloride, tin octanoate, and silica alumina.

Composition Requirements

The novel compositions capable of being molded according to the present invention will contain a mixture of polycyclic, aromatic, polycarboxylic acids and polyols such that the ratio of carboxyl groups to hydroxyl groups will be in the range of about 0.5:1 to about 3:1, preferably about 1:1 to about 2:1.

If desired, the molding powder mixture can also be formulated by incorporating therein, prior to any curing or molding step, suitable reinforcing agents, such as sand, powdered glass, glass filaments, glass cloth, mica, graphite or the like. The amount of reinforcing agent can take up to about 90% by weight of the total composition, based upon the three necessary components of the composition. However, in general, the amount of reinforcing agent will be between about 20% to 40% by weight of the molding composition.

In each composition, there will be an effective amount of the third component acid catalyst. The amount effective to accelerate the rate of reaction between the polycarboxylic acid and the polyol will depend upon such things as the ratio of carboxyl groups to hydroxyl groups, the amount of reinforcing agent contained in the mixture, and the nature and reactivity of the particular polycarboxylic acid and polyol, or mixtures thereof, employed. Those having skill in this art will understand that the amount of acid catalyst employed will depend upon many factors, all within the routine understanding of the art.

The three basic components of the composition should be intimately mixed, for example, in a ball mill using Burundum balls for from about 1 to about 24 hours, prior to any curing or molding step. It is also recommended that the mixture be reduced to a relatively fine powder, preferably one whose particle size is such that substantially all will pass through a 50 mesh (U.S.) screen. For most composition mixtures, this can be accomplished by mixing the materials in a ball mill using Burundum balls for from about 16 to 24 hours at ambient temperature and pressure conditions.

Molding Process Parameters

It will be desired to obtain a molded resin product having a Barcol hardness within the range of about 10 to 50, preferably about 20 to about 40, and maintaining its structural integrity under conditions of ordinary stress. The molded piece should not be unduly brittle or fracture or break into pieces when subjected to routine handling. In order to obtain molded products meeting these criteria, it has been found necessary that the powdered mixture obtained as outlined above be subjected to pre-curing conditions prior to any attempt to mold the mixture.

Precure can be readily accomplished by subjecting the curable mixture obtained after comminution to a temperature within the range of about 80° to about 150° C. for an extended period of time, usually no more than 15 to 30 minutes and typically less than about 2.0 hours to about 4.0 hours. This precure heating step will preferably be carried out at ambient, i.e. atmospheric, pressure conditions. However, so long as molding conditions are not attained, the pressure can be lower than atmospheric, as well as higher, even as high as up to 2,000 pounds per square inch gauge (13.9 MPa). Pressure, time and temperature limitations will be governed to some extent by the activity and initial stability of the curable mixture components employed. In general, it appears that the precure stabilizes the polycarboxylic acids against premature loss of carboxy groups. The preferred precure conditions for most curable compositions prepared according to the present invention will include ambient pressure, temperatures of about 100° to about 130° C., and a heating time of from about 0.5 to about 2 hours.

Once precure has been carried out, the moldable resin compositions produced are capable of withstanding relatively wide extremes of temperature, handling and storage conditions, without deterioration. This will enable the moldable compositions produced according to the present invention to be packaged and stored for later use. Alternatively, the precured moldable mixture obtained as outlined above may be subjected directly to suitable molding conditions. In either event, it has been found critical, in order to produce acceptable molded resin products, that the molding conditions be defined within the following parameters:

the temperature must be in the range of about 170° to about 220° C., preferably in the range of from about 190° to about 210° C.;

the molding pressure (dependent to some extent upon the particular ingredients of the composition, and the degree of precure) should be in the range of about 200 to about 20,000 per square inch gauge (1.39 to 139 MPa), preferably from about 2,000 to about 10,000 pounds per square inch gauge (13.9 to 70 MPa).

It is usually sufficient to carry out the molding at these conditions for from about 0.25 to about 4 hours, preferably about 0.5 to about 2 hours.

EXAMPLES

The present invention will now be described with reference to specific examples. Such examples are presented for purposes of illustration only, and should not in any circumstances be deemed to limit the present invention. Unless otherwise indicated, all percentages will be set forth as weight percentages.

A number of molding compositions were prepared and subjected to several molding conditions. The mixture of polycyclic aromatic polycarboxylic acids used in each of the runs was obtained as follows:

Into a 30 gallon glass-lined reactor, equipped with a mechanical stirrer and heating and cooling coils, there were charged 55 pounds of water and 4.56 liters of 70% aqueous nitric acid solution. The resultant solution was thoroughly mixed and thereafter heated to 60° C. A coal slurry mixture containing 45 pounds of ground North Dakota lignite in 45 pounds of water was added at the rate of one pound per minute until 60 pounds were added. During this addition, the temperature of the resultant slurry was maintained at 60° C. and was maintained for an additional three hours thereafter. The reaction product was then cooled to room temperature and discharged from the reactor. Two gallons of the product were filtered and the filter cake washed with water. The recovered solids were dried in a vacuum oven and constitute the mixture of polycyclic aromatic, polycarboxylic acids used in the reactions with the defined polyols in the specific examples below.

EXAMPLE I

A powder formulation was prepared using 46 grams (Neutral Equivalent=230) of the polycyclic, aromatic, polycarboxylic acids prepared above (hereinafter referred to as "Coal Acids") and 6.2 grams of glycerol. The ratio of carboxyl to hydroxyl groups in such mixture, as in the mixtures in the subsequent examples herein, was 1:1. The solid Coal Acids and liquid glycerol were added to a ball mill and, using Burundum balls therein, were mixed for 16 hours. The dry powder obtained was passed through a 50 mesh screen and then molded into a disc shape at a temperature of 165° C. and a pressure of 10,000 pounds per square inch gauge (60 MPa) for one hour. The disc was then cooled in the mold at the defined pressure to room temperature. The sample disc was brittle and broke into many pieces in the mold.

EXAMPLES II

This run was similar to Example I except that after screening, but before molding, the powder was heated for one hour at 100° C. and ambient pressure. Although the Barcol hardness of the disc was 10, the disc again broke into many pieces in the mold.

EXAMPLE III

The run of Example II was repeated except that precuring was carried out for 0.5 hour at 100° C. and ambient pressure and the temperature during molding was 200° C. In this case the Barcol hardness was 12 but again the disc broke into many pieces in the mold.

EXAMPLE IV

This run was similar to Example III except that to the mixture in the ball mill there was added 0.5 gram of para-toluene sulfonic acid, and the temperature during molding was 165° C. The sample disc was brittle and broke into many pieces in the mold.

EXAMPLE V

Example IV was repeated, except that the molding temperature was 200° C. A molded disc was obtained having a Barcol hardness of 40. There were no signs of breakage of the disc.

The data obtained are summarized below in Table II.

TABLE II

| Example | Coal Acids, Grams | Polyol | Grams of Polyol | Para-Toluene Sulfonic Acid, Grams | Precure Conditions | | Hours | Temp., °C. | PSIG (MPa) | Barcol Hardness (ASTM-D2583) | Comments |
|---|---|---|---|---|---|---|---|---|---|---|---|
| | | | | | Hours | Temp., °C. | | | | | |
| I | 46 | Glycerol | 6.2 | None | None | | 1 | 165 | 10,000(69) | 0 | Disc Broke In Mold |
| II | 46 | Glycerol | 6.2 | None | 1 | 100 | 1 | 165 | 10,000(69) | 10 | Disc Broke In Mold |
| III | 46 | Glycerol | 6.2 | None | 0.5 | 100 | 1 | 200 | 10,000(69) | 12 | Disc Broke In Mold |
| IV | 46 | Glycerol | 6.2 | 0.5 | 0.5 | 100 | 1 | 165 | 10,000(69) | 0 | Disc Broke In Mold |
| V | 46 | Glycerol | 6.2 | 0.5 | 0.5 | 100 | 1 | 200 | 10,000(69) | 40 | Disc Did Not Break In Pieces |
| VI | 46 | Glycerol | 6.2 | 0.5 | None | | 1 | 200 | 10,000(69) | 20 | Disc Broke In Mold |
| VII | 8.73 | Glycerol* | 1.18 | 0.09 | 0.5 | 120 | 1 | 200 | 10,000(69) | 58 | Disc Did Not Break In Pieces |
| VIII | 46 | Ethylene Glycol | 6.0 | 0.5 | 0.5 | 120 | 1 | 200 | 10,000(69) | 42 | Disc Did Not Break In Mold |
| IX | 46 | Tetra-ethylene Glycol | 19.2 | 0.65 | 0.65 | 120 | 1 | 200 | 5,000(35) | 10 | Disc Did Not Break In Mold |
| X | 23 | Diethylene Glycol | 5.3 | 0.28 | 0.28 | 120 | 1 | 200 | 5,000(35) | 10 | Disc Did Not Break In Mold |

*Also present in mixture were 10 grams of fine sand.

EXAMPLE VI

Example V was repeated, except that the molding composition was molded with no precuring. While the Barcol hardness of the disc was 20, the disc broke into many pieces in the mold.

EXAMPLE VII

A powdered formulation was prepared in accordance with the procedure of Example I containing 8.73 grams of Coal Acids, 1.18 grams of glycerol, 10 grams of fine sand and 0.09 gram of para-toluene sulfonic acid. The mixture was precured at 120° C. for one-half hour and ambient pressure and cured at 200° C. for one hour at 10,000 pounds per square inch gauge (69 MPa). The disc obtained had a Barcol hardness of 58 and showed no signs of breakage.

EXAMPLE VIII

Example VII was repeated, except that 46 grams of coal acids, 6.0 grams of ethylene glycol and 0.5 gram of paratoluene sulfonic acid was used to prepare the molding mixture. The molded disc had a Barcol hardness of 42 and showed no signs of breakage.

EXAMPLE IX

Example VIII was repeated, except that 19.2 grams of tetra-ethylene glycol were used in place of the ethylene glycol and there was present 0.65 gram of para-toluene sulfonic acid. The molding pressure was 5,000 pounds per square inch gauge (35 MPa). The molded disc had a Barcol hardness of 10 and showed no signs of breakage.

EXAMPLE X

Example VIII was again repeated, except that 23 grams of coal acid and 0.28 gram of para-toluene sulfonic acid were used and instead of ethylene glycol 5.3 grams of diethylene glycol were used. The pressure was the same as in Example IX. The molded product obtained was similar in hardness and appearance to that of Example IX.

The data in Table I show that when the molding powder herein was subjected to the defined molded conditions, as in Examples V, VII, VIII, IX and X, an excellent molded product was obtained, having desirable hardness and toughness characteristics.

The foregoing description and examples have been directed to particular embodiments of the invention in accordance with the requirements of the Patent Statutes and for purposes of illustration and explanation. It will be apparent, however, to those skilled in this art that many modifications and changes in the procedures set forth will be possible without departing from the scope and spirit of the invention. The following claims should be interpreted to embrace all such modifications and variations.

We claim:

1. A process for preparing a molded resin product which comprises forming a curable mixture consisting essentially of
   (a) a mixture of substantially water insoluble polycyclic, aromatic, polycarboxylic acids prepared by subjecting a water slurry of coal to reaction with aqueous nitric acid having a concentration of from about 5% to about 90% by weight at a temperature of about 15° to about 200° C. for about 0.5 to about 15 hours,
   (b) one or more polyols defined by the formula $$HO-R-(OH)_x$$

wherein x is a number from 1 to 5 and R is an organic bifunctional radical selected from the group consisting of aliphatic, cycloaliphatic and carbocyclic radicals having from 2 to 10 carbon atoms, and
   (c) an effective amount of suitable acid catalyst capable of producing and maintaining a reaction between (a) and (b),
wherein
   the acid/hydroxy ratio of said curable mixture is in the range from about 0.5 to about 3.0;
   subjecting said curable mixture at non-molding pressure conditions to a temperature in the range between 80° to about 150° C. for at least about 15 minutes to about 4.0 hours; and, thereafter molding said curable mixture at a temperature of from about 170° to about 220° C., and a pressure of about 200 to about 20,000 psi gauge.

2. The process of claim 1 wherein the curable mixture is subjected to a temperature between about 100° to about 130° C. for at least between about 30 minutes to about 2 hours prior to subjecting the resulting composition to molding conditions.

3. The process of claim 2 wherein the acid/hydroxy ratio of said curable mixture is in the range from about 1 to about 2.

4. The molded resin product prepared by the process of claim 1.

5. The molded resin product prepared by the process of claim 2.

6. A molded resin product prepared by the process of claim 3.

7. The process for producing a moldable resin composition capable of being cured under suitable molding conditions into a solid resinous material having improved toughness and hardness characteristics which comprises:

(a) Preparing a finely divided intimate mixture consisting essentially of:
(i) the substantially water insoluble, polycyclic, aromatic, polycarboxylic acid product obtained by subjecting a slurry containing coal to reaction with aqueous nitric acid having a concentration of about 5% to about 90% at a temperature of about 15° C. to about 200° C. for about 0.5 to about 15 hours, said acid product having a neutral equivalent between about 150 and about 350;

(ii) one or more polyols defined by the formula $$HO-R-(OH)_x$$

wherein x is a number from 1 to 5 and R is an organic bifunctional radical selected from the group consisting of aliphatic, cycloaliphatic and carbocyclic radicals having from 2 to 10 carbon atoms, and (iii) a suitable acid catalyst, wherein the ratio of total acid neutral equivalents to total available hydroxy equivalents of said polyol ranges from about 0.5 to about 3.0, and (b) subjecting said curable mixture to an increased temperature, in the range between about 80° C. to about 150° C. but not under molding pressure and temperature conditions, for a period of at least 15 minutes.

8. The process of claim 7 wherein the acid product is insoluble in both water and polar solvent.

9. The moldable composition produced by the process of claim 7.

10. The moldable composition produced by the process of claim 8.

* * * * *